(12) United States Patent
Blümler et al.

(10) Patent No.: US 6,232,403 B1
(45) Date of Patent: May 15, 2001

(54) ELASTOMER MATERIAL

(75) Inventors: Norbert Blümler, Hemsbach; Ernst Osen, Birkenau; Klaus Lux; Volker Peterseim, both of Weinheim, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/460,074

(22) Filed: Dec. 14, 1999

(30) Foreign Application Priority Data

Dec. 22, 1998 (DE) .............................. 198 59 257

(51) Int. Cl.⁷ .............................. C08L 27/12; C08L 9/00
(52) U.S. Cl. .......................... 525/191; 525/199; 525/200; 525/232; 525/233
(58) Field of Search ..................................... 525/191, 199, 525/200, 232, 233

(56) References Cited

U.S. PATENT DOCUMENTS

| 4,987,826 | * | 1/1991 | Deppert et al. | 92/168 |
| 6,079,715 | * | 6/2000 | Johnen et al. | 277/565 |

* cited by examiner

*Primary Examiner*—Nathan M. Nutter
(74) *Attorney, Agent, or Firm*—Kenyon & Kenyon

(57) ABSTRACT

An elastomer material, particularly for use as a seal material in oil-lubricated engines, where the elastomer compound is a blend of a fluorocaoutchouc (FCM) and at least a second elastomer, which contains the fluorocaoutchouc as the minority component at 5 to 30 phr.

20 Claims, No Drawings

ELASTOMER MATERIAL

BACKGROUND INFORMATION

1. Field of the Invention

The invention relates to the production of an elastomer material which is supposed to demonstrate a high level of thermal and chemical resistance, particularly as a seal material for use in oil-lubricated engines.

2. Description of Related Art

In modern engines, more and more oil types with aggressive additive packages (basic additives, particularly amine components) are being used in order to accomplish various tasks. This is particularly true for transmission oil. These additives frequently result in a change in the elastic properties of seal materials, which result in failure of the elastomer material after a short period of use. This also holds true for fluorocaoutchoucs which are available on the market. In order to achieve better oil resistance, various new elastomer materials were developed. For example, fluorocaoutchouc polymers (FCMs) were introduced, which demonstrate improved resistance to bases, among other things. However, these new fluorocaoutchoucs can only be used for special applications, because of their price. Another approach is based on the idea of using FCMs not as a homopolymer, but rather as an elastomer blend. This involves either a blend of acrylate polymer/FCM, or a blend of ethylene acrylate caoutchouc/FCM. However, the results achieved with them were not satisfactory, particularly not with regard to additives that are strong bases, such as amine additives, which are present in the oil.

SUMMARY OF THE INVENTION

It is an object of the invention to provide an elastomer material that demonstrates a high level of thermal and chemical resistance, and which is particularly useful as a seal material for oil-lubricated engines.

This object and other objects of the invention are accomplished, according to the invention, in that an elastomer material is formed from an elastomer blend of a fluorocaoutchouc (FCM) and of at least a second elastomer of the type of a caoutchouc, where the proportion of the fluorocaoutchouc is not allowed to exceed 5 to 30 phr.

DETAILED DESCRIPTION OF THE INVENTION

In experiments, it was surprisingly shown that even the low proportion of fluorocaoutchouc in the elastomer blend is sufficient to transfer the extremely low relaxation of FCM into the elastomer blend, something that is absolutely necessary for seal materials. This synergistic effect has the result that it becomes possible to combine a high level of resistance of the material to bases, particularly amines, with continued good temperature and oil resistance, particularly the low level of relaxation of FCM, by using only very small amounts of FCM in an elastomer compound. This finding is contrary to those of previous studies. Previous deliberations proceeded from the assumption that an elastomer compound based on pure fluorocaoutchouc or a high proportion of fluorocaoutchouc has the highest level of resistance from a thermal and chemical aspect. However, it was shown that proceeding from a proportion of 100% FCM, the oil resistance does not significantly change as the proportion of FCM is reduced, and actually increases sharply at an FCM proportion of about 30%, and then drops again after reaching a peak. This behavior was tested at use temperatures above 150° C.

In addition to the fluorocaoutchouc component, those elastomers which demonstrate a high polarity and can be crosslinked with peroxide are particularly suitable for production of the elastomer blends. The selection of the second or third elastomer which is blended with the fluorocaoutchouc is made in accordance with these criteria, along with sufficient temperature and media resistance.

It was determined in experiments that a copolymer of ethylene vinyl acetate caoutchouc, tetrafluoroethylene propylene caoutchouc, acrylate caoutchouc or a hydrogenated nitrile caoutchouc yields particularly good results as the second and third elastomer.

In the production of an elastomer blend of only two components, the proportion of the second elastomer is between 70 and 95 phr. However, with an increasing proportion of the second elastomer, the elastomer material became less suitable during processing. It was shown that the use of a third elastomer has a particularly advantageous effect on the processing of the FCM blends.

The invention will be illustrated below, using two examples which must be regarded in an illustrative, rather than a restrictive, sense.

EXAMPLE 1

A polymer blend of an ethylene vinyl acetate (70%) copolymer and a fluoro-elastomer (tetrapolymer), crosslinked with peroxide, is produced. This results in a bi-blend with the proportions of 80 phr fluoro-elastomer.

The initial values of the bi-blend were:

| | |
|---|---|
| Shore Hardness A | 66 |
| Tensile strength MPa | 15.1 |
| Elongation to tear % | 180 |
| Modulus of elasticity 100% MPa | 5.8 |

After the bi-blend was kept in a multi-range oil with a high level of (amine) additive at 100° C. for 1000 hours, the following values were determined, with the changes in the pure components also being listed for comparison. The changes to be expected with regard to the blend composition (arithmetically calculated average) are also indicated in parentheses. The relaxation behavior, which is surprisingly very good in comparison with the pure components, is indicated after only 300 hours, since the pure components failed before reaching the 1000 hour mark.

| Change after 1000 h/150 ° C. in Anglamol 6055/Sturaco 94/6 | Ethylene vinyl acetate (70%) | Blend 80/20 | FCM |
|---|---|---|---|
| Hardness (points) | 3 | 14 (+3) | 5 |
| Tensile strength (%) | −11 | 17 (−26) | −84 |
| Elongation to tear (%) | −11 | −59 (−26) | −84 |
| Volume swelling (%) | 21.9 | 27 (18) | 2.6 |
| Relaxation after 300 h (%) | −82 | −52 (−72) | −31 |

These values are positive and are not achieved with the polymer blends which have been usual until now.

EXAMPLE 2

For the production of a tri-blend, an ethylene vinyl acetate (70%) copolymer and a fluoro-elastomer (tetrapolymer) are used, as in Example 1. Again the proportion of the ethylene vinyl acetate copolymer is 80 phr, while the proportion of the fluoro-elastomer was reduced to 10 phr. The remaining 10 phr are filled up by the tetrafluoroethylene propylene copolymer.

The initial values of the tri-blend are comparable with those of the bi-blend:

| Shore Hardness A | 63 |
|---|---|
| Tensile strength MPa | 16.5 |
| Elongation to tear % | 192 |
| Modulus of elasticity 100% MPa | 5.5 |

After the tri-blend was stored under the same conditions as in Example 1, the following results were achieved:

| Change after 1000 h/150 °C. in Anglamol 6055/Sturaco 94/6 | EVA (70%) | Tetrafluoroethylene- propylene copolymer | Blend 80/10/10 | FCM |
|---|---|---|---|---|
| Hardness (points) | 3 | −11 | 5 (2) | 5 |
| Tensile strength (%) | −11 | −31 | 6 (−20) | −84 |
| Elongation to tear (%) | −11 | 26 | −51 (−15) | −84 |
| Volume swelling (%) | 21.9 | 8.8 | 14.1 (19) | 2.6 |
| Relaxation after (%) 300 h | −82 | −67 | −49 (−75) | −31 |

These values are improved, particularly with regard to the volume change, in addition to the continued surprisingly low relaxation. Furthermore, processing of the tri-blend proved to be significantly more advantageous than that of the bi-blend.

What is claimed is:

1. An elastomer material comprising a blend of a fluoro-caoutchouc (FCM) and at least a second elastomer, wherein the fluorocaoutchouc comprises a minority component of the blend.

2. The elastomer material according to claim 1, wherein the fluorocaoutchouc is present in the blend in a proportion of about 5 to 30 phr.

3. The elastomer material according to claim 1, wherein said at least a second elastomer demonstrates a high polarity and can be crosslinked with peroxide with an amine.

4. The elastomer material according to claim 2, wherein said at least a second elastomer demonstrates a high polarity and can be crosslinked with peroxide with an amine.

5. The elastomer material according to claim 1, wherein said at least a second elastomer is present in the blend in a proportion of 70 to 95 phr.

6. The elastomer material according to claim 2, wherein said at least a second elastomer is present in the blend in a proportion of 70 to 95 phr.

7. The elastomer material according to claim 3, wherein said at least a second elastomer is present in the blend in a proportion of 70 to 95 phr.

8. The elastomer material according to claim 4, wherein said at least a second elastomer is present in the blend in a proportion of 70 to 95 phr.

9. The elastomer material according to claim 1, wherein said at least a second elastomer is a copolymer of ethylene vinyl acetate, tetrafluoroethylene propylene caoutchouc, acrylate caoutchouc or a hydrogenated nitrile caoutchouc.

10. The elastomer material according to claim 2, wherein said at least a second elastomer is a copolymer of ethylene vinyl acetate, tetrafluoroethylene propylene caoutchouc, acrylate caoutchouc or a hydrogenated nitrile caoutchouc.

11. The elastomer material according to claim 3, wherein said at least a second elastomer is a copolymer of ethylene vinyl acetate, tetrafluoroethylene propylene caoutchouc, acrylate caoutchouc or a hydrogenated nitrile caoutchouc.

12. The elastomer material according to claim 4, wherein said at least a second elastomer is a copolymer of ethylene vinyl acetate, tetrafluoroethylene propylene caoutchouc, acrylate caoutchouc or a hydrogenated nitrile caoutchouc.

13. The elastomer material according to claim 5, wherein said at least a second elastomer is a copolymer of ethylene vinyl acetate, tetrafluoroethylene propylene caoutchouc, acrylate caoutchouc or a hydrogenated nitrile caoutchouc.

14. The elastomer material according to claim 6, wherein said at least a second elastomer is a copolymer of ethylene vinyl acetate, tetrafluoroethylene propylene caoutchouc, acrylate caoutchouc or a hydrogenated nitrile caoutchouc.

15. The elastomer material according to claim 7, wherein said at least a second elastomer is a copolymer of ethylene vinyl acetate, tetrafluoroethylene propylene caoutchouc, acrylate caoutchouc or a hydrogenated nitrile caoutchouc.

16. The elastomer material according to claim 8, wherein said at least a second elastomer is a copolymer of ethylene vinyl acetate, tetrafluoroethylene propylene caoutchouc, acrylate caoutchouc or a hydrogenated nitrile caoutchouc.

17. A seal material which may be used in an oil-lubricated engine, comprising a blend of a fluorocaoutchouc (FCM) and at least a second elastomer, wherein the fluorocaoutchouc comprises a minority component of the blend.

18. The seal material according to claim 17, wherein the fluorocaoutchouc is present in the blend in a proportion of about 5 to 30 phr.

19. The seal material according to claim 17, wherein said at least a second elastomer demonstrates a high polarity and can be crosslinked with peroxide with an amine.

20. The seal material according to claim 17, wherein said at least a second elastomer is present in the blend in a proportion of 70 to 95 phr.

* * * * *